(12) United States Patent
Uenoyama et al.

(10) Patent No.: US 7,082,163 B2
(45) Date of Patent: Jul. 25, 2006

(54) PICTURE CODING METHOD, PICTURE CODING APPARATUS AND IMAGE RELAYING APPARATUS

(75) Inventors: Tsutomu Uenoyama, Kawasaki (JP); Kazunori Yamada, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 362 days.

(21) Appl. No.: 09/992,044

(22) Filed: Nov. 16, 2001

(65) Prior Publication Data

US 2002/0085636 A1 Jul. 4, 2002

(30) Foreign Application Priority Data

Nov. 20, 2000 (JP) .......................... P. 2000-352949

(51) Int. Cl.
*H04N 7/12* (2006.01)

(52) U.S. Cl. ................................. 375/240.12
(58) Field of Classification Search ................ 348/409, 348/411, 441, 442, 407.1, 413; 382/56, 41, 382/244, 236, 238, 232; 375/240.01, 240.02, 375/240.25, 240.04, 240.12, 240.13
See application file for complete search history.

(56) References Cited

U.S. PATENT DOCUMENTS

| | | | | |
|---|---|---|---|---|
| 5,202,770 A | * | 4/1993 | Murakami et al. | 382/246 |
| 5,416,521 A | * | 5/1995 | Chujoh et al. | 375/240.14 |
| 6,002,802 A | * | 12/1999 | Chujoh et al. | 382/236 |
| 6,269,123 B1 | * | 7/2001 | Fujishiro et al. | 375/240.29 |
| 6,567,554 B1 | * | 5/2003 | Sugahara et al. | 382/232 |
| 6,647,060 B1 | * | 11/2003 | Ueda | 375/240.02 |
| 2003/0154687 A1 | * | 8/2003 | Sugarhara et al. | 52/750 |
| 2004/0008896 A1 | * | 1/2004 | Suzuki | 382/244 |

FOREIGN PATENT DOCUMENTS

JP 8-237657 9/1996

* cited by examiner

*Primary Examiner*—Vu Le
*Assistant Examiner*—Behrooz Senfi
(74) *Attorney, Agent, or Firm*—Pearne & Gordon LLP

(57) ABSTRACT

A picture coding apparatus contains a rate control unit 100, an image buffer 200, an orthogonal transformation unit 300, a quantizing unit 400, a variable length coding unit 500, a motion predicting unit 600, a coding unit 700, and an output buffer 800. The rate control unit 100 allocates a target code amount to each of pictures, and transfers a quantizing value 100*a* which is determined by a code amount to the quantizing unit 400. This target code amount is calculated by adding a reference target code amount to a correction value. The correction value is calculated based on a difference between a predetermined target value and an actual value of a remaining coding picture amount of the output buffer 800.

4 Claims, 13 Drawing Sheets

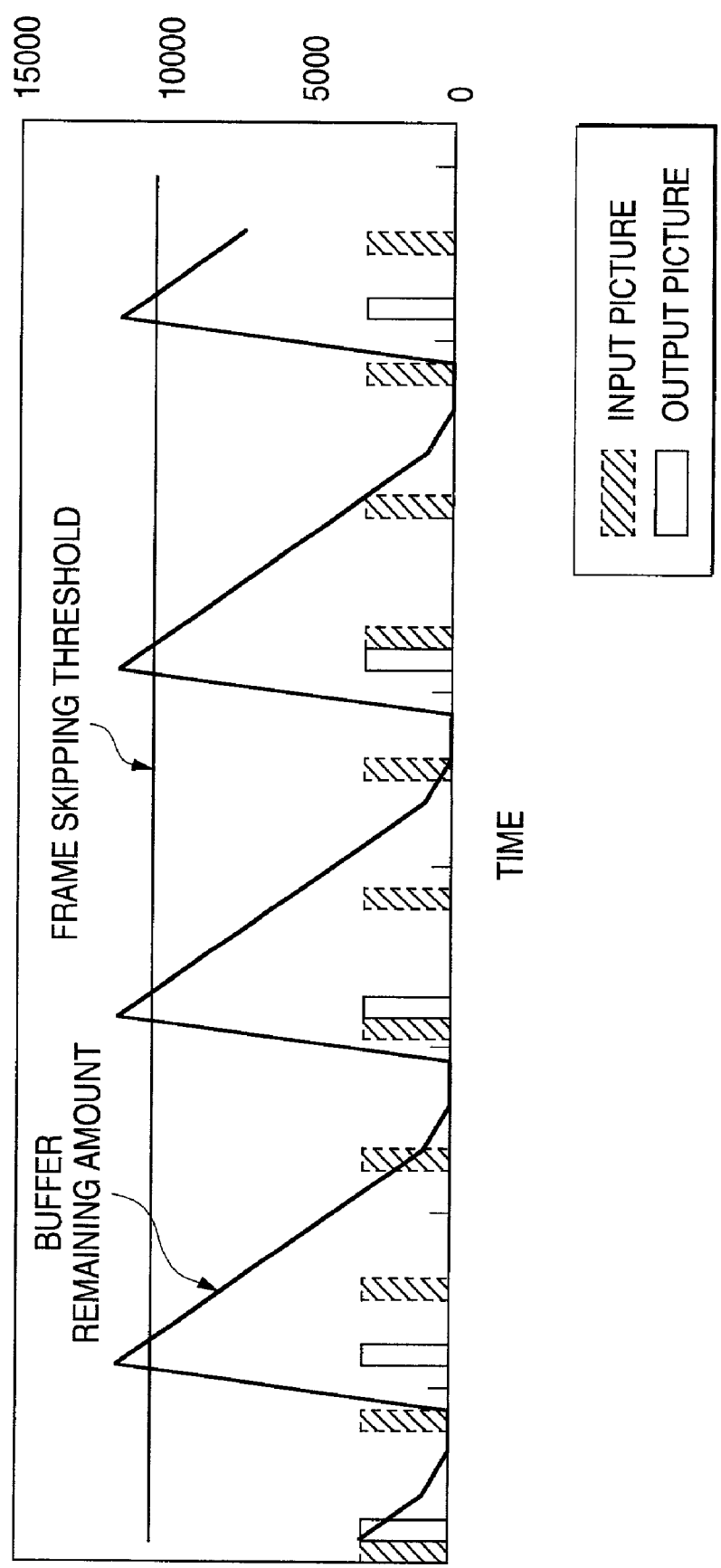

PICTURE CODING METHOD, PICTURE CODING APPARATUS AND IMAGE RELAYING APPARATUS

BACKGROUND OF THE INVENTION

1. Field of the Invention

The present invention is related to a picture coding apparatus and a picture coding method, for re-coding a digital compressed picture signal to obtain such a digital picture signal having either the same compression format or the different compression format from that of the digital compressed picture signal. More specifically, the present invention is directed to a picture coding apparatus and a picture coding method, capable of increasing a bit using efficiency when a digital compressed picture signal as an input picture signal is re-coded so as to reducing a number of frame skipping operations in the case that a total frame number of the digital compressed picture signal per unit time is varied.

2. Description of the Related Art

Conventionally, television conference systems using a narrow band ISDN have been practically utilized. Such a television conference system may be realized by a picture compression technique capable of compressing digitalized conference pictures so as to obtain a predetermined amount of conference data which can be transferred in real time within the frequency band of the narrowband ISDN. FIG. 8 represents an example of a picture transmission in a television conference system. In general, narrow bands (low bit rate) of either 64 kilobits per second (64 Kbps) or 128 Kbps, which is narrow in order to transfer pictures, are employed as a transmission path in such a television conference system.

In general, as a picture compression system for such a low bit rate, the ITU-T recommendations H.261 and H.263, and the specification 14496-2 of ISO/IEC (usually referred to as an "MPEG-4 Video"), and the like are used. While picture compression operations by way of these picture compression systems are utilized in real-time communication such as television conference system, the below-mentioned conditions should be satisfied:

Amounts of generated picture codes do not exceed a transmission band.

Delays are small, which do not disturb communications.

To satisfy these conditions, in such a picture compression operation, two different rate controls called as a "quantizing control" and a "frame skipping control" are carried out, so that coding operations capable of satisfying these conditions are realized.

The quantizing control corresponds to such a control in which code amounts allocated to each picture and each macroblock contained in a picture are determined, and quantizing steps are determined based upon these determined code amounts. The frame skipping control corresponds to such a control in which when an amount of data which have already been coded but have not yet been transferred (namely, output buffer remaining amount) exceeds a constant amount, the next picture is not coded, but skipped.

As a concrete example of such a rate control, there is the method described in "MPEG-4 Video Verification Model version 16.0" of ISO/IEC JTC1/SC29/WG11 N3312 (will be abbreviated as a"VM16" hereinafter). This VM16 indicates an example of realizing the concrete compressing/decoding system of MPEG-4 Video (ISO/IEC 14496-2), and implies the general-purpose system having high practical possibilities. FIG. 9 shows a flow chart for describing the rate control executed based upon VM16.

At a step 10 of this flow chart, a parameter required for executing the rate control is set as an initializing process. At a step 20, a target code amount allocated to a picture which is presently encoded is calculated in accordance with the below-mentioned sequence (expressions are described by C language program. Various sorts of below-mentioned process operations are similarly described by C Language program).

$T=Max(Rs/30, Rr/Nr*0.95+S*0.05);$ $T=T*(B+2*(Bs-B)/(2*B+(Bs-B));$ if$(B+T>0.9*Bs)$ $T=Max(Rs/30, 0.9*(Bs-B));$ else if$(B-Rp+T<0.1*Bs)$ $T=Rp-B+0.1*Bs;$ It should be understood that:

Max(a, b): a larger value among "a" and "b",

Min(a, b): a smaller value among "a" and "b",

T: a target code amount,

Rs: a bit rate with respect to a certain image segment,

Rr: a code amount which is left so as to code remaining frames within a subject image segment, Nr: a remaining frame number which should be coded within the subject image segment, S: a code amount used when a preceding frame is coded, B: a present remaining amount of an output buffer, and an initial amount is Bs/2, Bs: an output buffer size, Rp: a code amount extracted from the output buffer within 1 frame period (namely, inverse number of frame rate).

Subsequently, at a step 30, a quantizing value is determined in response to the target code amount acquired at the step 20. At a step 40, after the coding operation with respect to 1 frame is accomplished, an output buffer remaining amount, a remaining picture number, and the like are updated. Then, at steps 50-1 and 50-2, when the output buffer remaining amount exceeds 80% of the output buffer capacity, the next frame is skipped by the frame skipping control.

In this flow operation, an image segment indicates a group (cluster) of pictures which are theoretically segmented by certain constant time. For instance, assuming now that a segment is separated at every 1 second, a total number of pictures contained in this segment is equal to a frame rate. For example, in the case that pictures are coded at a frame rate of 10 pictures per 1 second, 10 screens of pictures are contained by 1 segment.

As described above, in order to execute the rate control of VM16, a coding frame rate is determined, and a coding operation should be carried out based upon the coding frame rate. Other general-purpose methods which are not described in this specification are also performed in a similar manner. That is, while coding frame rate is determined, a code amount to be allocated is calculated by using the determined coding frame rate.

In this case, a coding frame rate owns such an implication of a parameter which indicates a time duration defined from a time instant when a coding operation is presently carried out up to a coding operation of a next frame. For instance, when a coding frame rate is equal to 10 pictures/second, it can be seen that a time duration after one picture has been coded until a next picture is coded is equal to 0.1 second. Considering now of coding operations executed in the terminals of the television conference system exemplified in the example of FIG. 8, a coding frame rate may be freely set on the side of the transmission terminal in such a manner that this coding frame rate becomes equal to an integer-th of the output frame rate of the television camera, whereas images may be acquired under stable condition by the television camera in the compression unit provided on the side of the transmission terminal.

On the other hand, while terminals which employ different picture compression systems from each other are gradually popularized, there is such a need that pictures are transmitted/received among these terminals. In this case, apparatus for converting a picture compression system to another (will be simply referred to as "system converting apparatus" hereinafter) and vice versa are required between terminals. In FIG. 10, there is shown such a system for performing a picture communication between terminals having different sorts of picture compressing systems via a system converting apparatus. In a picture compressing unit 911 of a television conference terminal 91 provided on the transmission side, a rate control is carried out with respect to a picture signal which owns the known constant frame rate and is derived from a television camera. Then, the rate-controlled picture signal is transmitted via a transmission unit 912 to a transmission path, and is inputted into a system converting apparatus 92. As indicated in FIG. 11, a conversion unit 922 of the system converting apparatus 92 is arranged by an decompression unit 9221 and a compression unit 9222. The decompression unit 9221 decompresses a picture, compressed by a compression system of an input side and derived from a reception unit 921, so as to produce a decompressed picture. The compression unit 9222 recompresses this decompressed picture by way of a compression system of an output side. The recompressed picture signal is sent via a transmission path to a television conference terminal 93 provided on the reception side. The recompressed picture signal received by a reception unit 931 is converted by an decompression unit 932 into a decompressed picture which will be displayed on a television monitor.

However, in the system shown in FIG. 10 and FIG. 11, the input picture of the picture compression unit 911 of the television conference terminal 91 provided on the transmission side corresponds to the picture having the known constant frame rate, whereas the input picture of the compression unit 9222 employed in the system converting apparatus 91 corresponds to such a picture which has been once coded by the low bit rate and thereafter is decompressed. In the picture compression system of the low bit rate such as MPEG-4 video and the ITU-T recommendation H.261, since information of the frame rate is not contained in a stream, the frame rate of the input picture of the picture compression unit 9222 employed in the system converting apparatus 92 is unknown. Furthermore, there are many cases that frames are skipped in the frame skipping control during the coding operation in the terminal of the transmission side. In this case, the frame rate is not constant. In other words, after one picture is inputted, it is not clear when the next picture is inputted. As a result, in such a case that the above-explained general-purpose rate control is employed when the picture coding operation is carried out within the system converting apparatus 92, the below-mentioned problem will occur.

First, even when the coding frame rate is set to, for example, 15 pictures/second, in the case that the frame rate of the input frame is only 7.5 pictures/second, the pictures can be actually coded by only 7.5 pictures/second. However, since the frame rate employed in the calculation of the target coding amount in the rate control is equal to 15 pictures/second, the allocated code amount is small for the picture to be compressed at 7.5 pictures/second. The produced amount is decreased as compared with the allowed range (frame skipping threshold value). Then, in the case that the interval is furthermore prolonged since the input image itself is frame-skipped, the output buffer cannot afford to produce the codes. As a result, there is no data in the output buffer to be transmitted, the time duration during which the transmission path is used in a useless manner is prolonged.

FIG. 12 shows this example. FIG. 12 represents such an example of a transition of an output buffer remaining amount when the above-explained code amount allocating method by VM16 is employed. It should be noted that as to similar drawings, involving FIG. 12, which represent transitions of output buffer remaining amounts, abscissas thereof denote a time instant. Then, ordinates of these drawings show bit amounts left in the output buffer with respect to an output buffer remaining amount (line "B" shown in drawings) by values along a right axis. At the same time, with respect to a histogram of either an output picture or an input picture, the ordinate of this histogram represents any values other than the zero in the case that the relevant picture is present at the relevant time instant, and also shows the zero in the case that the relevant picture is not present at this relevant time instant, namely, shows as to whether or not the picture is present. As a consequence, a difference between a total number of non-zero values of an input picture and a total number of non-zero values of an output picture indicates a total number of pictures which are frame-skipped by the frame skipping control. Also, this graphic representation of FIG. 12 simulates operations of an encoder (coding device) accomplished by VM16 by setting the following assumption:

(1) a code amount which is actually produced by coding each of pictures is equal to an allocated code amount which is determined by the rate control; and (2) an input picture is entered at 10 pictures per second, and each of the inputted pictures is coded only one time at maximum (namely, same picture is not coded plural times). Other setting values are given as follows:

A length of 1 image segment=1 second,

Rs: a bit rate of an image segment=64 kilobits, a total picture number contained in 1 image segment=a coding frame rate, Bs: An output buffer size=0.2 seconds of a frame=12800 bits, Rp: an extracted code amount per 1 frame period=64 k/coding frame rate.

Originally, generally speaking, a code amount of each picture is theoretically simulated in such a manner that all of codes for one picture are immediately generated. However, it is so simulated that time is required for generating these codes, due to some reason. It should also be noted that this difference has no direct relationship as to a gist of the present invention. In this drawing, there are spaces between a second picture and a third picture, and between a fourth picture and a fifth picture, so that a frame rate is not constant. In the case that a coding frame rate larger than the actual coding frame rate is set in a fixed manner with respect to such an unstable frame rate, such large useless time of the transmission path occurs in the above-explained prior art, namely, there is completely no code to be transferred.

A further explanation is made of this reason. That is, in the example shown in FIG. 12, the coding frame rate is set to 30 pictures/second. As a result, while the code amount is allocated, such a code amount by which a picture transmission is completed by 1/30 seconds may constitute a reference of the code amount allocated to each of the pictures. This is a target code amount before being corrected, and this target code amount is approximately 2.1 kilobits (=2133 bits) in this example. On the other hand, since the coding frame rate is equal to 10 pictures/second even at such a place that no frame is skipped in the actual input picture, the interval between the pictures is equal to 1/10 seconds. In a general-purpose rate control system involving VM16, since an actual output buffer remaining amount is small, the target code amount is corrected in such a manner that the allocation code amount is made larger than the reference code amount. However, the correction corresponds to a coefficient with respect to the reference code amount, and becomes approximately 2 in maximum in VM16. This correction may have an effect in view of the following implication. That is, in the case that pictures can be entered under stable condition which is set by the coding unit, the code amount may be stably allocated. However, as explained in this example, in the case that the input picture owns the different coding frame rate from the set coding frame rate, there is a drawback that the difference between the set coding frame rate and the actual coding frame rate cannot be sufficiently solved. In this example, the target code amount which is corrected based upon the coefficient becomes approximately 4300 bits, so that such a condition is continued under which the output buffer remaining amount becomes low.

Furthermore, in the case that an input picture is dropped under this condition, since there is no spare code in the output buffer remaining amount, there is a lack of codes to be transferred. This implies that the code amount by which the codes could be originally transferred is not completely allocated. In general, the larger the code amount is allocated, the higher the image quality can be improved in the same coding system. As a result, in this case, such an image quality which could be originally achieved would be deteriorated. As previously explained, in the conventional rate control system by the coding operation, this rate control system is established based upon such an initial condition that such a picture adapted to the set coding frame rate is entered. As a consequence, as explained in the code converting apparatus shown in FIG. 12, when the picture adapted to the set coding frame rate cannot be inputted, the effective code amount allocation cannot be carried out.

Secondly, there is another problem that when the coding frame rate is set to a large coding frame rate so as to solve the above-explained problem, frame skipping operations occur many times. This example is shown in FIG. 13. FIG. 13 shows an output buffer remaining amount in the case that while a coding frame rate is set to 7.5 pictures/second, a coding operation is carried out with respect to an input picture whose coding frame rate is 10 pictures/second. As apparent from the drawing, although 11 pictures are entered, only 5 pictures are outputted, and thus, the remaining 6 pictures are frame-skipped. Among these six pictures, skipping of the two pictures is caused by the mismatching of the set coding frame rate with respect to the input frame rate, which cannot be solved by the rate control system. However, skipping of the remaining four pictures is caused by the frame skipping control.

This reason will now be explained. As previously described, in the conventional rate control method, there is such an initial condition that the pictures can be coded in accordance with the set coding frame rate. As a result, if the set coding rate is selected to be 7.5 pictures/second, then such a code amount that a transmission of one picture is completed within 1/7.5 seconds may constitute the reference of the allocation code amount. In the example shown in FIG. 13, since this set coding frame rate is mismatched with the actual input frame rate, the output buffer remaining amount is not stable, but also, the correction value may cause the target code amount to be excessively increased, or decreased. Accordingly, the frame skipping operations are usually carried out many times. In this case, the (motion) picture to be outputted may become (motion) pictures lacking smoothness, as compared with the input (motion) pictures. Moreover, the code amount with respect to such a picture which is originally to be coded becomes useless, and the image quality would be deteriorated.

As previously described, when the conventional rate control system is carried out in the system converting apparatus, the following problems may occur: That is, (1) since a frame rate of an input picture is unknown and variable, an appropriate target code amount cannot be set, but also such a code amount which can be originally used cannot be effectively used, so that the image quality is deteriorated. (2) Since frame-skipped motion pictures, which dropped frames prior to the input (to this system conversion apparatus), is inputted, a large number of necessary frames are skipped while the frame skipping operation is carried out during the conversion operation.

SUMMARY OF THE INVENTION

The present invention has an object to solve the above-explained problems. In other words, an object of the present invention may be achieved by that in a picture coding operation used in a system converting apparatus, a usable code amount can be effectively used with respect to an input picture whose frame rate is unknown and also is variable. Furthermore, an occurrence of a new skipping operation is reduced with respect to such an input picture that frames of this input picture are skipped, and an interval between frames is varied.

A picture coding method, according to the present invention, is featured by such a picture coding method for executing a coding control in such a manner that a target code amount is calculated every picture to be coded and a generated code amount of the picture to be coded is approximated to the target code amount, in which: the target code amount of the picture to be coded is calculated by adding a correction amount to a reference target code amount which is approximately constant; the reference target code amount is calculated from a reference coding frame rate; and the correction value is calculated based upon a difference between a predetermined target value and an actual value of a remaining coded picture amount of such a picture which has already been coded and has not yet been outputted from an apparatus. As a result, the usable code amount can be continuously and effectively utilized by the correction value. Also, the target value of the remaining coded picture amount is determined based upon a frame-skipping threshold value corresponding to a threshold value used to judge as to whether or not a next picture is coded. As a result, such a code amount allocation in which a frame skipping operation can hardly occur can be carried out.

Also, the predetermined target value of the remaining coded picture amount is determined based upon the reference target code amount. As a consequence, the code amount which is further approximated to the reference target code amount can be produced.

Furthermore, a frame rate of an inputted picture is measured; and the reference coding frame rate is determined based on the measured frame rate. As a result, the code amount which is suitable for the actual coding operation can be produced.

Also, the reference coding frame rate is determined based upon a maximum value of the measured frame rate. As a result, it is possible to reduce an occurrence of such a frame-skipping operation which is caused by a rapid variation in the frame rates.

Also, the reference coding frame rate is determined based upon an average value of the measured frame rates within constant time. As a result, such a code amount allocation which is fitted to a variation in input frame rates can be carried out.

Furthermore, in the case that the reference coding frame rate is updated based upon the average value of the measured frame rates within the constant time, when a reference coding frame rate before being updated is larger than a reference coding frame rate after being updated, a value between the reference coding frame rate before being updated and the reference coding frame rate after being updated is used as the reference coding frame rate after being updated. As a consequence, it can avoid an occurrence of such a frame-skipping operation when the reference target code amount becomes excessively large.

Another aspect of the present invention is a picture coding apparatus for coding an inputted image to output a compression picture signal, comprising a rate control unit having a function capable of adjusting a code amount generated every picture of the inputted image, which is to be coded; and an output buffer having a function capable of storing thereinto a generated code until the stored code is outputted from the picture coding apparatus; wherein the rate control unit controls the rate in such a manner that a target code amount of the picture to be coded is calculated by adding a correction value to a reference target code amount which is approximately constant and a generated code amount of the picture to be coded is approximated to the target code amount; the reference target code amount is calculated based upon a reference coding frame rate; and the correction value is calculated based upon a difference between a predetermined target value and an actual value of a buffer remaining amount corresponding to a code amount left in the output buffer. According to the above mentioned apparatus, a picture coding in which the usable code amount can be continuously and effectively utilized by the correction value is realized.

Yet another aspect of this invention is an image relaying apparatus, comprising an image receiving unit to receive an image from an external image transmission unit, an image transmission unit to transmit an image to an external image receiving unit, and a picture coding unit, for converting an image in a first image format received from the external transmission unit to a second image format suitable for the external receiving unit and transmitting the image in the second image format to the external receiving unit, wherein the picture coding unit comprising: a rate control unit having a function capable of adjusting a code amount generated every picture of an inputted image, which is to be coded; and an output buffer having a function capable of storing thereinto a generated code until the stored code is outputted from the picture coding apparatus; wherein the rate control unit controls the rate in such a manner that a target code amount of said picture to be coded is calculated by adding a correction value to a reference target code amount which is approximately constant and a generated code amount of the picture to be coded is approximated to the target code amount; the reference target code amount is calculated based upon a reference coding frame rate; and the correction value is calculated based upon a difference between a predetermined target value and an actual value of a buffer remaining amount corresponding to a code amount left in the output buffer. According to an image relaying apparatus of the present invention, an image relaying which requires a format conversion from an input image format to another is realized while a picture coding in which the usable code amount can be continuously and effectively utilized by the correction value.

BRIEF DESCRIPTION OF THE DRAWINGS

FIG. 13 is a diagram for representing another example of a transition of a buffer remaining amount when a code amount allocation is performed by way of VM16.

DESCRIPTION OF THE PREFERRED EMBODIMENTS

Next, embodiments of the present invention will be described with reference to drawings.

Figure 1:
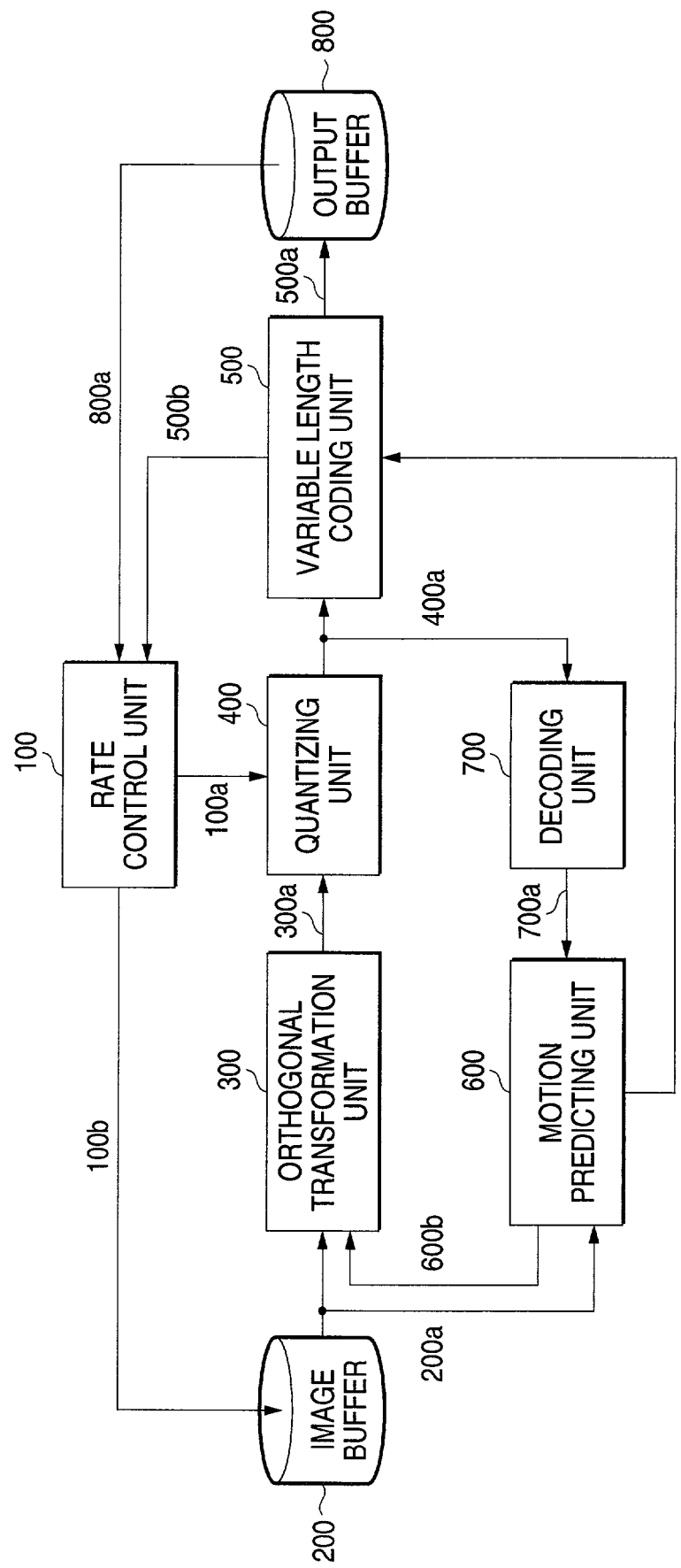
FIG. 1 is a functional block diagram of a picture coding apparatus.

FIG. 1 is a functional block for showing an arrangement of a picture coding apparatus according to a first embodiment of the present invention. This picture coding apparatus is to realize coding operations based upon such a general-purpose compression system as the recommendation H.261 of ITU-T and MPEG-4. A non-compression picture is entered into this picture coding apparatus, and a coded signal is outputted therefrom. As the entered non-compression picture, such a picture may be employed, the frame rate of which is unknown, and is dynamically changed due to frame skipping operation and the like. This picture coding apparatus contains a rate control unit 100, an image buffer 200, a orthogonal transformation unit 300, a quantizing unit 400, a variable length coding unit 500, a motion predicting unit 600, a decoding unit 700, and an output buffer 800.

The rate control unit 100 allocates a code amount to each of pictures based upon a data amount of a compression picture signal stored in the output buffer 800 (will be simply referred to as a "buffer remaining amount" hereinafter), determines a quantizing amount based upon the allocated code amount, and then, transfers the determined quantizing value 100a to the quantizing unit 400. Also, while the rate control unit 100 acquires the generated code amount 500b from the variable length coding unit 500, the rate control unit 100 may properly correct the quantizing value in the unit of either one macroblock or a plurality of macroblocks, and then may transfer the corrected quantizing value 100a to the quantizing unit 400. Furthermore, the rate control unit 100 may discard an image inputted into the image buffer 200 in response to the buffer remaining amount 800a, and may output a frame skipping instruction 100b. It should be noted that only typical data flows among the respective blocks are indicated in FIG. 1.

The image buffer 200 once stores thereinto a non-compression picture which is inputted in the unit of a picture, and supplies the entered picture 200a to either the orthogonal transformation unit 300 or the motion predicting unit 600. The orthogonal transformation unit 300 orthogonally transforms a prediction residual 600b which is outputted from either the inputted picture 200a or the motion predicting unit 600, and supplies the orthogonally transformed prediction residual to the quantizing unit 400. The quantizing unit 400 quantizes a transformation coefficient 300a which is acquired from the orthogonal transformation unit 300 based upon the quantizing value 100a designated by the rate control unit 100, and then supplies a quantized transformation coefficient 400a corresponding to this quantized result to the variable length coding unit 500. The variable length coding unit 500 carries out variable-length coding on the quantized transformation coefficients 400a which is received from quantizing unit 400, the quantizing value, and motion vector received from motion predicting unit 600, and output the result as a compressed picture signal 500a to he output buffer 800. Also, the generated code amount 500b is transferred to the rate control unit 100.

The motion predicting unit 600 predicts the input image 200a acquired from the image buffer based upon a reference image 700a acquired from the decoding unit 700, and supplies a motion vector 600a corresponding to the predicted result to the variable length coding unit 500, and also supplies the prediction residual 600b to the orthogonal transformation unit 300. The decoding unit 700 acquires such information as the quantized transformation coefficients 400a and the motion vector from the quantizing unit 400 and the variable length coding unit 500, and then decodes this acquired information in a similar manner to the decoding operation of the compression picture signal so as to form a de-compressed picture 700a which constitutes a reference image. Then, the decoding unit 700 supplies the formed de-compressed picture 700 to the motion predicting unit 600. The output buffer 800 temporarily stores thereinto the compression picture signal 500a produced by the variable length coding unit 500, and then outputs the stored compression picture signal outside this picture coding apparatus.

Figure 2:
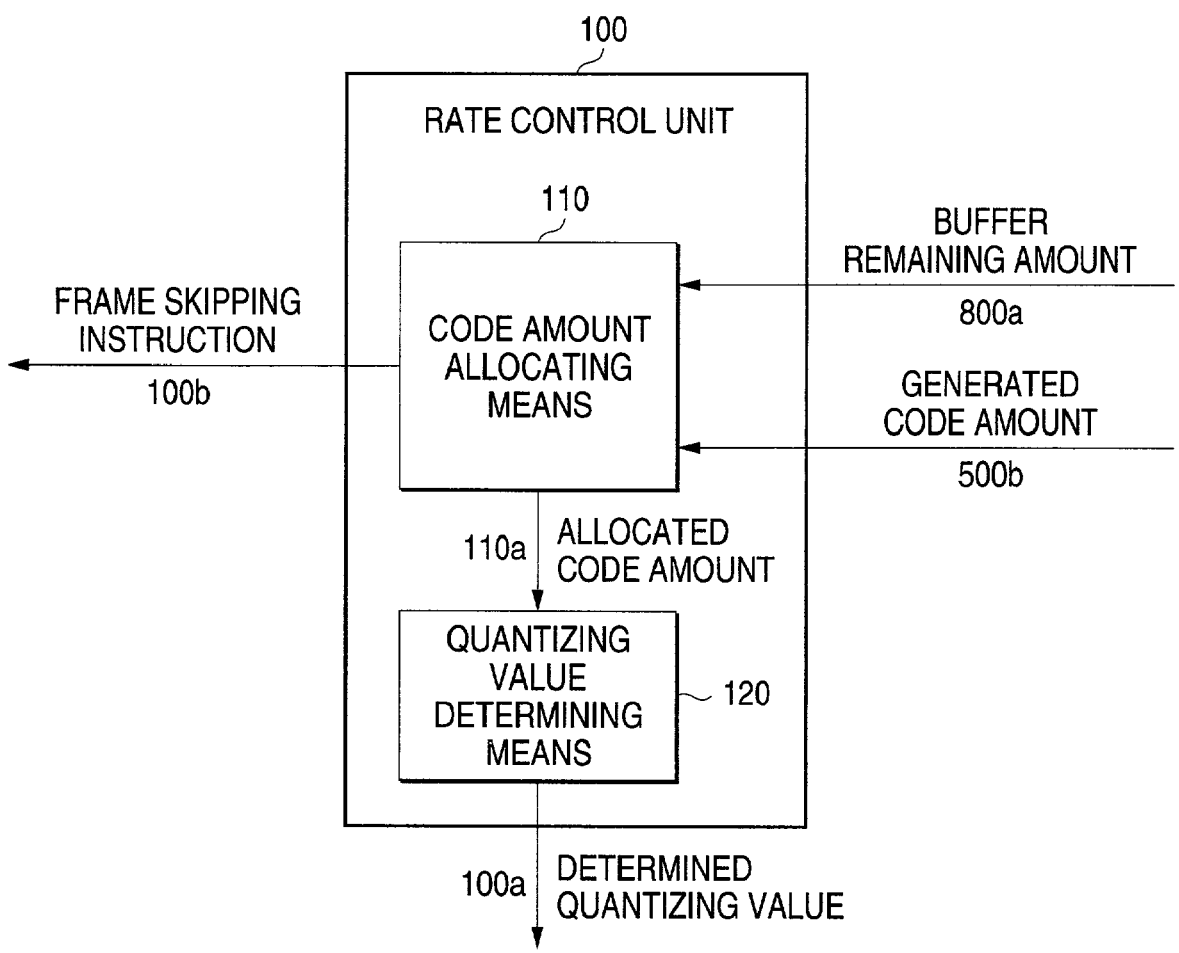
FIG. 2 is a functional block diagram of a rate control unit of a first embodiment.

Next, both a structure and operation of the rate control unit 100 will now be described in detail. FIG. 2 is a functional block diagram for indicating an arrangement of the rate control unit 100. As indicated in FIG. 2, the rate control unit 100 contains a code amount allocating means 110 and a quantizing value determining means 120. The code amount allocation means 110 inputs there into both the buffer remaining amount 800a acquired from the output buffer 800 and the generated code amount 500b which is acquired from the variable length coding unit 500, and determines an allocated code amount 110a to output this allocated code amount 110a. The quantizing value determining means 120 inputs the allocated code amount 110a outputted from the code amount allocating means 110, and determines the quantizing amount 100a to output this quantizing amount 100a.

Figure 3:
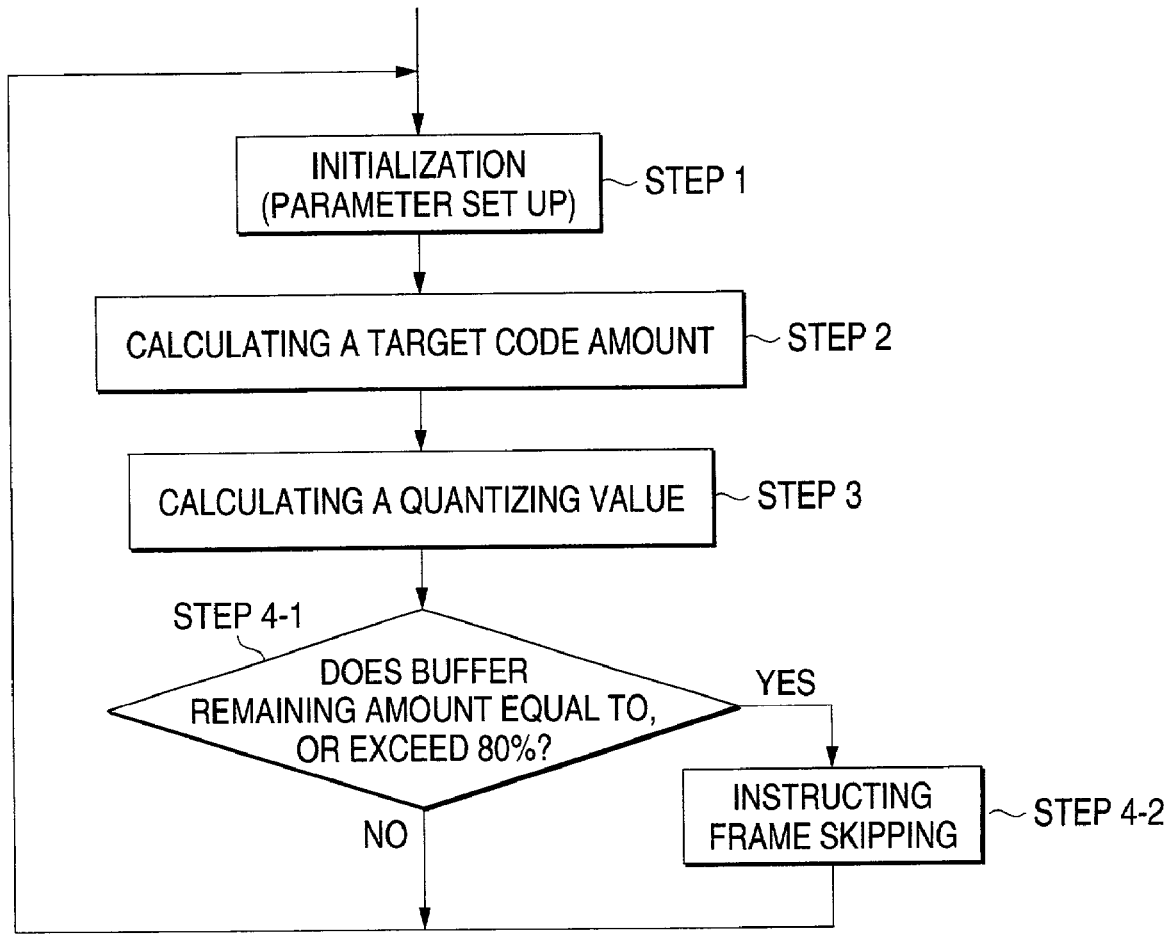
FIG. 3 is a flow chart for describing a flow operation of a process operation of the rate control unit.

FIG. 3 is a flowchart for describing a process flow operation of the rate control unit 100. At a step 1, the code amount allocating means 110 sets/updates an internally used parameter as an initializing process operation. It should be noted that externally acquired values such as the buffer remaining amount are newly acquired outside the picture coding apparatus. At a step 2, the code amount allocating means 110 calculates a target code amount, and transfers the calculation result as the allocation code amount 110a to the quantizing amount determining means 120.

At a step 3, the quantizing value determining means 120 determines the quantizing value 100a based upon the allocated code amount 110a. Then, at a step 4-1 and another step 4-2, after the coding operation of the relevant picture has been accomplished, the code amount allocating means 110 newly acquires the buffer remaining amount 800a, and when the buffer remaining amount 800a exceeds 80% of the output buffer size, the code amount allocating means 110 outputs the frame skipping instruction 100b with respect to the image buffer 200.

Among these process operations, a detailed explanation will be furthermore made of the target code amount calculating process operation (defined at step 2) by the code amount allocating means 110. An allocated code amount in the unit of a picture is calculated by the below-mentioned formula:

$$T = Tt + \alpha;$$

Note that:
 T: an allocated code amount,
 Tt: a reference target code amount,
 α: a correction value.

Next, in order that a delay is suppressed within a constant range and also an overflow and/or an underflow of the output buffer 800 are prevented, both an upper limit value and a lower limit value are provided in the allocated code amount, and then, are clipped. This clipping method is carried out by the following process operation as one example:

$$T: Max(R/30, T);$$

$$T: Min(Bs*0.8, T+B);$$

where
 R: a coding bit rate,
 B: a buffer remaining amount,
 Bs: an output buffer size.

It should be understood that the reference target code amount is calculated based upon the reference coding frame rate, and the correction value is calculated based upon both the buffer remaining amount and the target buffer remaining amount. As one example, the reference target code amount "Tt" and the correction value "α" are calculated by executing the below-mentioned process operation:

$$Tt = R/Ft;$$

$$\alpha = (Bt-B)*P;$$

where

Ft: a reference coding frame rate,
Bt: a target buffer remaining amount,
P: a correction value calculating coefficient (for instant, correction value calculating coefficient is set to 1.2).

In this embodiment, the reference coding frame rate is set in a fixed manner based upon a predictable input frame rate of an actually entered non-compression picture to such a frame rate value which exceeds this predictable input frame rate, for example, 30 pictures/second. Also, as explained later, the target buffer remaining amount is determined based upon either the frame skipping threshold value of the input picture or the reference target code amount.

In this method, since the correction value "α" is not the coefficient of the reference target code amount Tt, the resultant may be corrected independently from the reference target code amount Tt. As a consequence, even when the reference target code amount is set to an improper value as viewed from the actual input frame rate, the value (of "α") may be corrected based upon the actual buffer remaining amount irrespective of this value, and the available bits may be effectively utilized. On the other hand, since the reference target code amount "Tt" corresponding to the stable value (namely, constant in this embodiment) may be employed, even when the correction value is largely changed from the continuously varied buffer remaining amount, it is possible to suppress an excessive variation of the allocation code amount calculation result.

Next, a description will now be made of a process operation of the quantizing value determining means 120. The quantizing value determining value detecting means 120 determines a quantizing value based upon an allocated code amount thereof in accordance with a general-purpose method such as, for example, the quantizing value determining method of Vm16. In this case, the quantizing value determining method by Vm16 is represented. Assuming now that a quantizing value to be calculated is equal to "Qc", and also the allocated code amount is equal to "T", this quantizing value "Qc" may be calculated as follows:

$$if((X2==0 \| ((X1*Ec)**2+4*X2*Ec*(T-Hp))<0))$$

$$Qc = X1*Ec/(T-Hp);$$

$$else\ Qc = (2*X2*Ec)/(sqrt((X1*Ec)**2+4*X2*Ec*(T-Hp))-X1*Ec);$$

$$Qc = Min(ceil(Q1*1.25), Qc, 31);$$

$$Qc = Max(ceil(Q1,*0.75), Qc, 1);$$

where

Ec: an average value of absolute values of a motion prediction residual. When compressed within a frame, this is an average value of pixel values,
Q1: a quantizing value used in preceding calculation,
Hp: code amounts of a header and a motion vector, which are produced in preceding picture,
X1, X2: modeling parameters.

It should also be noted that a modeling parameter implies such a parameter used to adjust a quantizing value determining characteristic, and this modeling parameter is properly set based upon a compression system and a characteristic of an apparatus.

Subsequently, a description will now be made of a concrete determining method for determining the target buffer remaining amount "Bt" which is employed in the rate control unit 100 of the picture coding apparatus shown in FIG. 1. As previously explained, the target buffer remaining amount "Bt" is employed so as to calculate the correction value "α" which is used to acquire the target code amount "T."

In the first determining method, the target buffer remaining amount "Bt" is determined based upon a frame skipping threshold value "Dth." This frame skipping threshold value "Dth" is a set value regarding the buffer remaining amount 800a. This set value is used in order that an image entered into the image buffer 200 is discarded, and the frame skipping instruction 100b is outputted. For instance, this frame skipping threshold value "Dth" is set to 80% of the buffer size of the output buffer 800. In this determining method, the target buffer remaining amount "Bt" is calculated as follows:

$$Bt = Dth*Pd;$$

where

Pd: a target buffer remaining amount calculation coefficient (0<Pd<1, for instance, 0.5).

Figure 4:
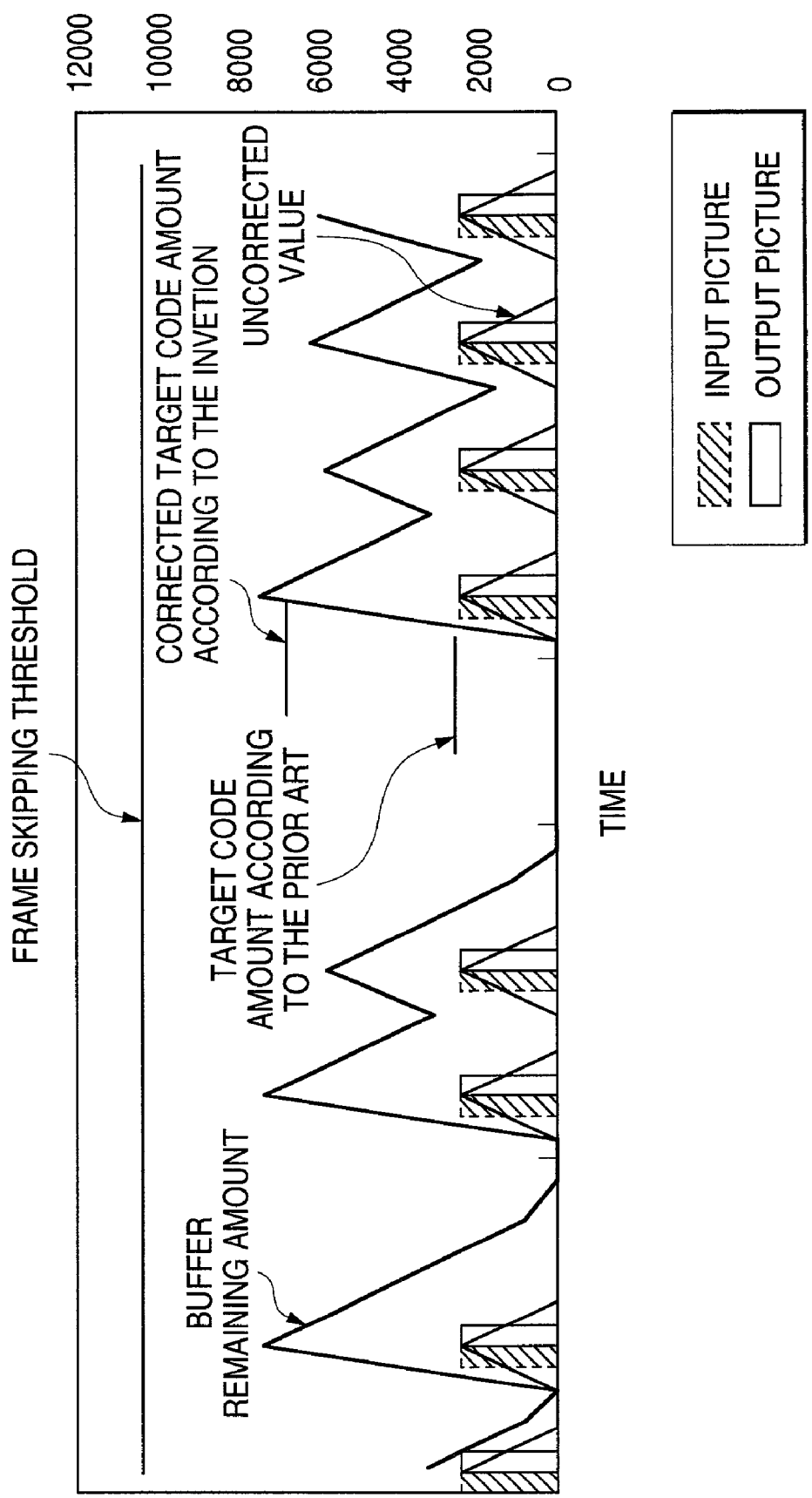
FIG. 4 shows an example of a transition of a buffer remaining amount under rate control according to an embodiment of the present invention.
Figure 12:
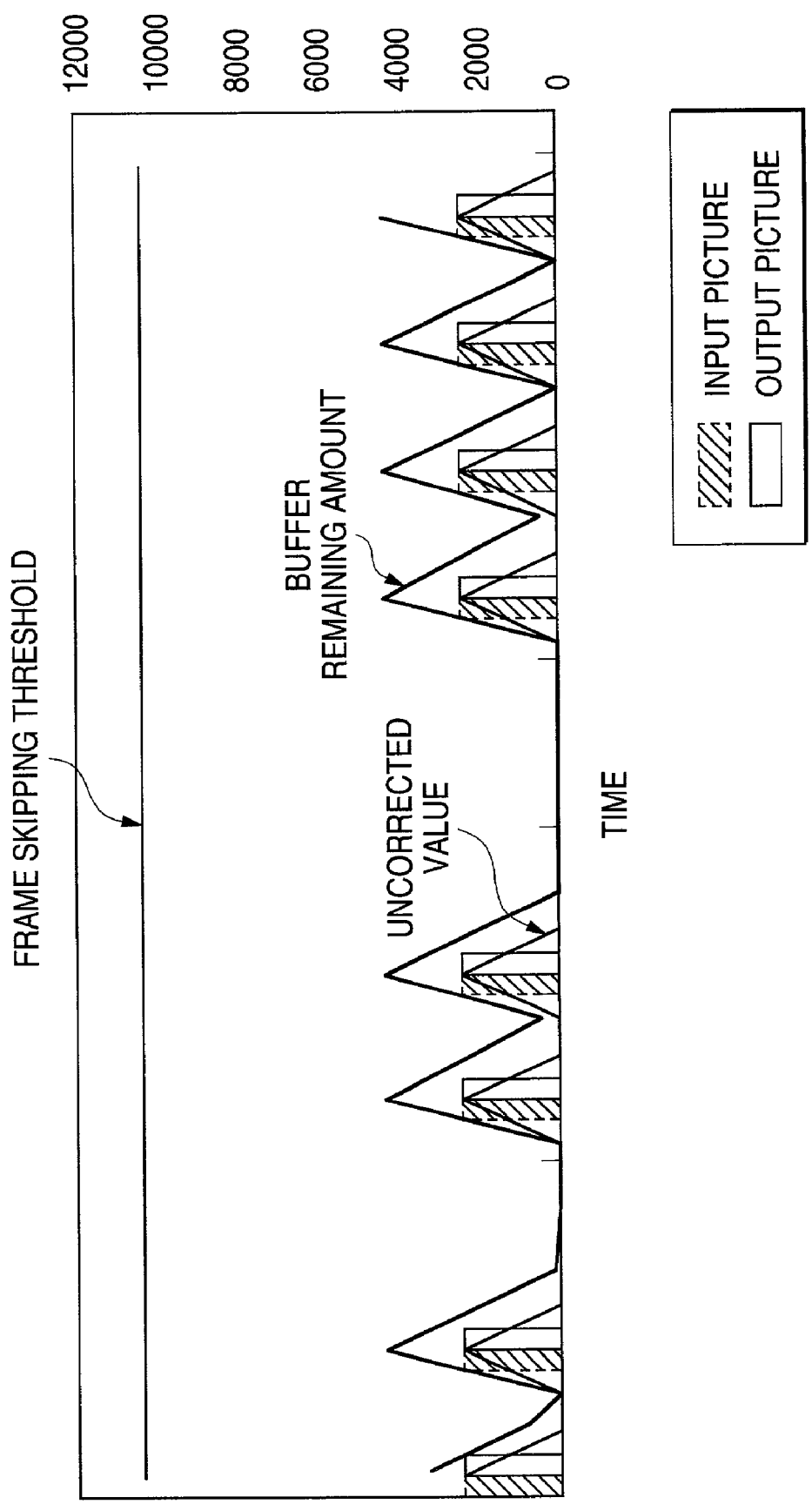
FIG. 12 is a diagram for representing an example of a transition of a buffer remaining amount when a code amount allocation is performed by way of VM16.

FIG. 4 is a graphic representation for simulating a transition of a buffer remaining amount by the picture coding apparatus by way of a calculation with employment of this determining method. Except for the method of determining the target code amount, other conditions are identical to the simulation conditions of FIG. 12 and FIG. 13. In this example, the reference coding frame rate is equal to 30 pictures/second. The result of the prior art apparatus in which a similar coding frame rate is set corresponds to the simulation result of FIG. 12. Since the coding frame rate is set identical to each other, the reference target code amount before the correction in each of the pictures shown in FIG. 4 is identical to the target code amount before the correction in FIG. 12, namely is equal to approximately 2133 bits. However, in accordance with the present invention, the target code amount is not adversely influenced by this value, but may be corrected in response to the target buffer remaining amount. As indicated in FIG. 4, a target code amount determined when the buffer remaining amount is equal to 0 may become approximately 7300 bits by adding the target buffer remaining amount (12800 bits×0.8×0.5=5120 bits) to the previously explained reference target code amount. As previously explained, the buffer remaining amount becomes larger than that of the prior art. As a result, the time duration during which the buffer remaining amount becomes zero can be shortened, as compared with that of the prior art. Therefore, even in such a case that the input frame is dropped and thus, the interval of the frames which can be coded is prolonged, the code amount can be more effectively used, and also the deterioration in the image quality can be suppressed.

As previously explained, in accordance with this determining method, while the code amounts are effectively allocated to even such an unstable input frame rate, the target code amount capable of lowering the frame skipping threshold value can be set, so that the frame skipping operations can be reduced.

In the second determining method, the target buffer remaining amount "Bt" is determined based upon a reference target code amount "Tt." The reference target code amount "Tt" is determined based upon a reference coding frame rate "Ft" and a bit rate "R" in accordance with such a formula of Tt=R/Ft. In this second determining method, the target buffer remaining amount "Bt" is determined based upon the below-mentioned formula by employing this reference target code amount "Tt":

$$Bt=Tt*Pd;$$

where

Pd: a target buffer remaining amount calculation coefficient (0<Pd, for example, 0.5).

In this case, a relationship between the buffer remaining amount "Bt" and the reference target code amount "Tt" will now be explained. The buffer remaining amount "Bt" is a value indicative of a delay. For example, in the case that a buffer remaining amount is equal to a reference target code amount, a delay produced by the output buffer corresponds to a reference coding frame period. In general, there is such a feature that the lower a frame rate becomes, the lower a delay amount can be hardly recognized by a human. For instance, although a delay of 0.5 seconds contained in 10 pictures per second may become apparent, a delay of 0.5 seconds contained in 1 picture per second can be hardly recognized. Also, by allowing a large amount of delays, allowable amount of code amount for each picture may be increased. While code amounts are effectively allocated, qualities of an entire picture can be more uniformly improved.

As a consequence, in accordance with this determining method, the delay amount can be set to the target delay amount in correspondence with the desirable frame rate during the coding operation, and the more effective code amount can be realized. Also, in the case that the reference target code amount is calculated based upon the below-mentioned method, since the reference coding rate may become such a frame rate fitted to the input picture, the correction value with small wasteful amount and adapted to the condition of the input picture can be determined in accordance with this determining method.

In the first embodiment, the reference coding frame rate which is employed by the rate control unit 100 is fixed. In a second embodiment, a reference coding frame rate is determined based upon an input frame rate. As a result, it is possible to set such a target code amount which is further suitable for a coding operation. Since a code amount is effectively used, a deterioration of an image quality and also a frame-skipping operation can be reduced.

Figure 5:
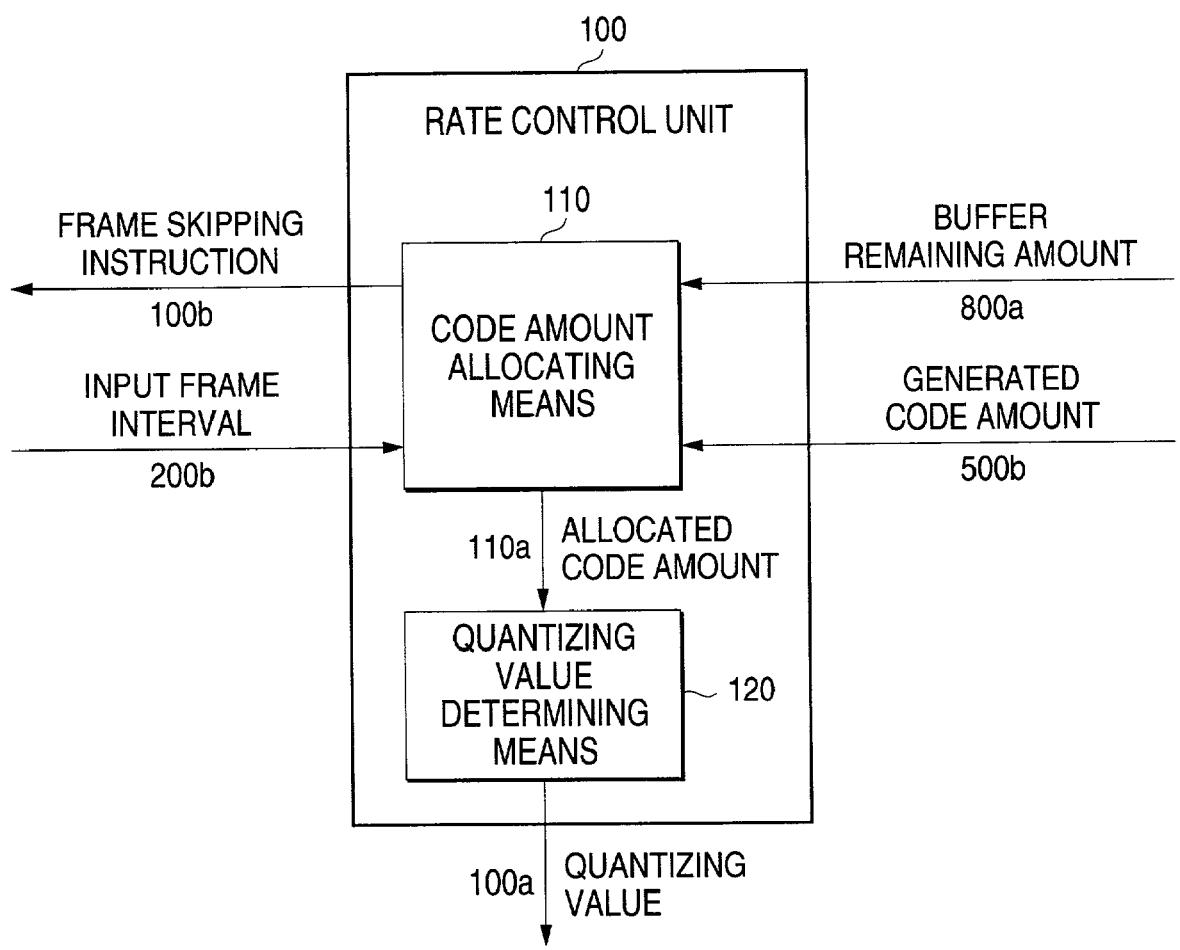
FIG. 5 is a functional block diagram of a rate control unit of a second embodiment.

An entire arrangement of a picture coding apparatus of the second embodiment is similar to that of the first embodiment, and a functional flock of this picture coding apparatus is indicated in FIG. 1. Also, an internal arrangement of a rate control unit 100 is represented in the functional block of FIG. 5. The rate control unit 100 is constituted by both a code amount allocating means 110 and a quantizing value determining means 120, which is similar to those of the first embodiment. It should be understood that the code amount allocating means 110 inputs thereinto information 200*b* of an input frame interval which is obtained from the image buffer 200 in addition to the buffer remaining amount 800*a* and the generated code amount 500*b*. This input frame interval 200*b* corresponds to a time duration defined by that after a picture stored in the image buffer 200 is inputted into the code mount allocating means 110, a next new picture is inputted thereinto. For instance, an input frame interval L(n) of an n-th picture represents a time duration defined by that after (n−1)-th picture is inputted into the code amount allocating means 110, the n-th picture is inputted. By calculating an inverse number of this time duration, an instantaneous input frame rate at this time instant is obtained. In other words, an input frame rate "F(n)" at such a time instant when the n-th picture is inputted may be calculated as F(n)=1/L(n). Also, while information as to an input frame interval within constant time is stored, an average value thereof is calculated, so that an averaged input frame rate within the constant time may also be calculated. For example, an averaged input frame rate "Favg(a, b)" defined from an a-th picture up to a b-th picture may be calculated based upon the following formula:

$$Favg(a, b) = \frac{\sum_{n=a}^{b} F(n)}{(b-a)} = \frac{1}{(b-a)} \sum_{n=a}^{b} \frac{1}{L(n)} \quad \text{[Formula 1]}$$

Next, operations of the picture coding apparatus according to this second embodiment will now be explained. The overall operation of this apparatus is similar to that of the apparatus indicated in the first embodiment. Also, operations of the rate control unit 100 are similar to those of the rate control unit 100 of the first embodiment within the range shown in FIG. 3. It should be noted that a method for determining a reference coding frame rate is different from that of the first embodiment, which is executed in the target code amount calculating process operation (step 2 of FIG. 3). In other words, in the first embodiment, the fixed value is used as the reference coding frame rate, whereas an input frame rate is calculated by employing the input frame interval 200*b* acquired from the image buffer 200, and then, a reference coding frame rate is determined based upon this calculated input frame rate in this second embodiment.

Next, a description will now be made of a method for determining a reference coding frame rate based upon an input frame rate according to this second embodiment.

A first determining method corresponds to such a method for calculating a reference coding frame rate based upon a maximum input frame rate which is measured while a coding process operation is carried out. In this determining method, the reference coding frame rate is determined as follows: This process operation is carried out every picture:

$$Ft=\text{Max}(Ft, F(n))*Pf;$$

where

Pf: a calculation coefficient of a reference coding frame rate (0<Pf, for example, Pf=1.1), n: an inputted picture number (n-th picture).

A target code amount may be preferably set in such a manner that codes which are generated by coding a picture at a certain time instant may be consumed when the next picture is coded. To this end, an input frame interval F(n+1) is required to be calculated. When the input frame interval F(n+1) is actually acquired in order to code an n-th picture, a delay of the length corresponding to 1 picture will occur, which is not suitable for a real-time communication. As a substitution means, there is an effect that as the input frame interval F(n+1), the actual value is not used, but such a value which is calculated from the past input frame intervals is used as a predicted value. However, as explained in this embodiment, in the case that the time duration up to the next coding operation is commenced is unknown, when the input frame interval F(n+1) is calculated from only F(n), this calculated input frame interval F(n) may become extremely larger than the interval F(n+1), because an input picture is frame-skipped. In this case, as the reference target code amount, such an extremely larger value than the target code amount which should be originally set would be set. As a result, the reference target code amount cannot be corrected based upon the correction value, but the larger target code amount is set, so that the useless code amounts larger than the necessary code amount are allocated. Since the buffer remaining amount is furthermore increased, there is such a problem that the frame skipping operation will occur.

Figure 6:
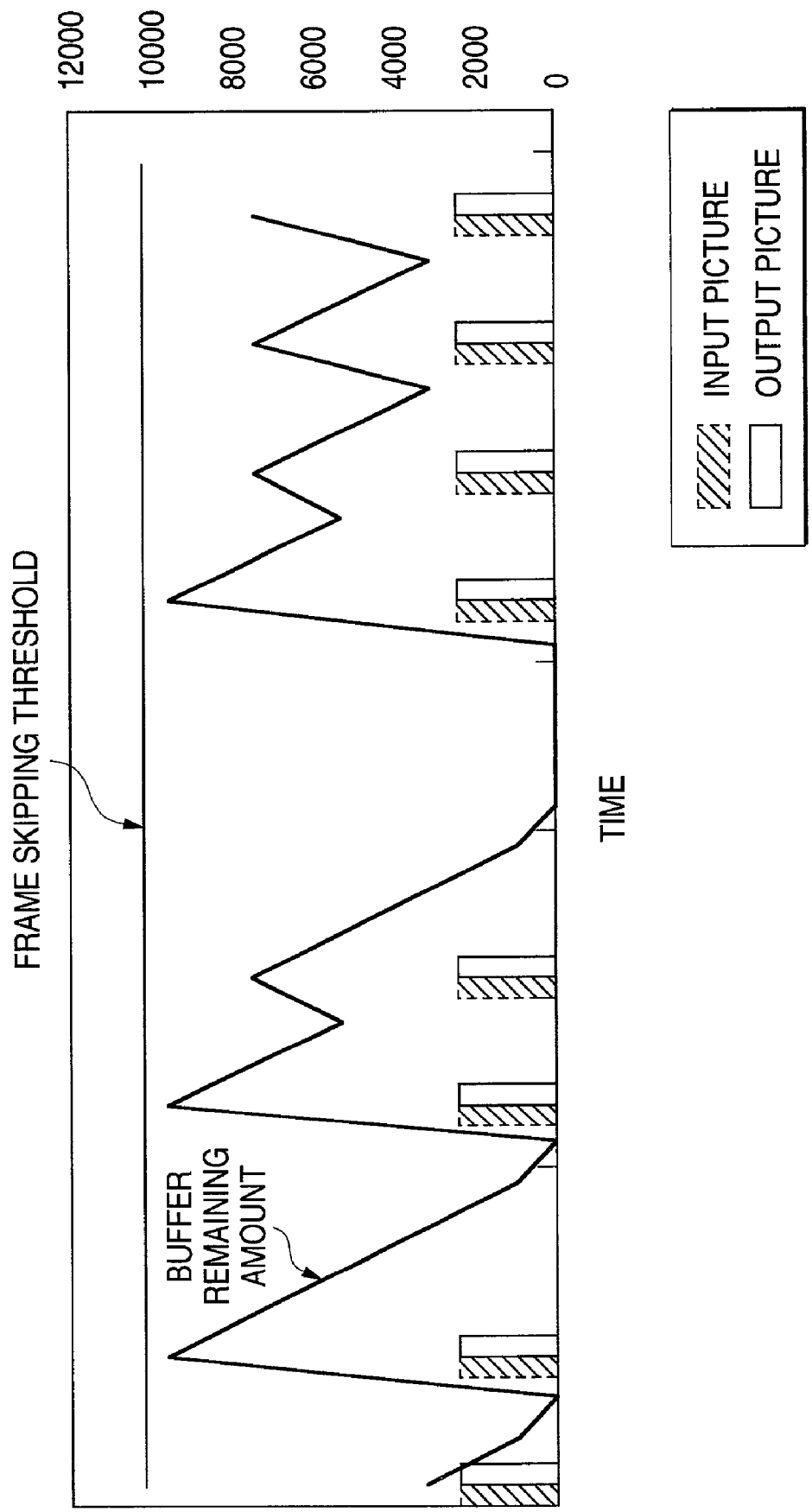
FIG. 6 shows a transition of a buffer remaining amount by a rate control with employment of a maximum value of input frame rates.

To the contrary, in accordance with this determining method, in the case that the shortest input frame interval is employed, namely the maximum input frame rate is used, there is a low possibility that the determined reference coding frame rate is smaller than the frame rate by which the coding operation can be actually carried out. As a consequence, there is a high possibility that the reference target code amount is equal to code amounts, all of which may be consumed until the next picture is coded. This reference target code amount can reduce the frame skipping operation. FIG. 6 is a graphic representation for graphically showing that a transition of a buffer remaining amount of the picture coding apparatus with employment of this determining method is simulated by way of a calculation. As indicated in this drawing, the effective allocation of the code amounts is realized under stable condition even in the case that the input picture is frame-skipped.

As previously described, in accordance with this determining method, the code amount allocation suitable for the input picture can be carried out, and the frame skipping can be reduced.

A second determining method corresponds to such a method for calculating a reference coding frame rate based upon an average frame rate of input frame rates which have been acquired within a past constant time period after the coding operation was commenced.

In this determining method, the reference coding frame is determined based upon the below-mentioned method. This process operation is carried out on every picture.

$Ft(n)=Favg*Pf;$ $Favg=avg(F(n), F(n-1), - - - ., F(n-l+1));$ where
Pf: a calculation coefficient of a reference coding frame rate (0<Pf, for example, Pf=0.8),
l=a total number of pictures contained in a time period used for averaging calculation.

In accordance with this second determining method, a larger reference target code amount than that of the first determining method may be set. As a result, useless codes can be reduced, as compared with that of the first determining method.

A third determining method is similar to the second determining method, and corresponds to the following determining method. That is, while a calculation is made of an average "Favg" of input frame rates within constant time, when the average "Favg" is larger than a reference coding frame rate "Ft" at this time, this average "Favg" is directly assigned to the reference coding frame rate "Ft", whereas when the average "Favg" is smaller than this frame rate "Ft", any value between "Favg" and "Ft", an average value for example, is assigned to "Ft." In accordance with this determining method, the reference coding frame rate is determined based upon the below-mentioned manner. This process operation is carried out every picture.

$Favg=avg(F(n), F(n-1), - - - ., F(n-l+1));$ if $(Favg>=Ft)Ft=Favg;$ else $Ft=((Favg*Pf)+(Ft*(1-Pf));$ Note that:
Pf: a calculation coefficient of a reference coding frame rate (0<Pf<1, for example, 0.5),
l: a total number of pictures contained in time period for averaging calculation.

Figure 7:
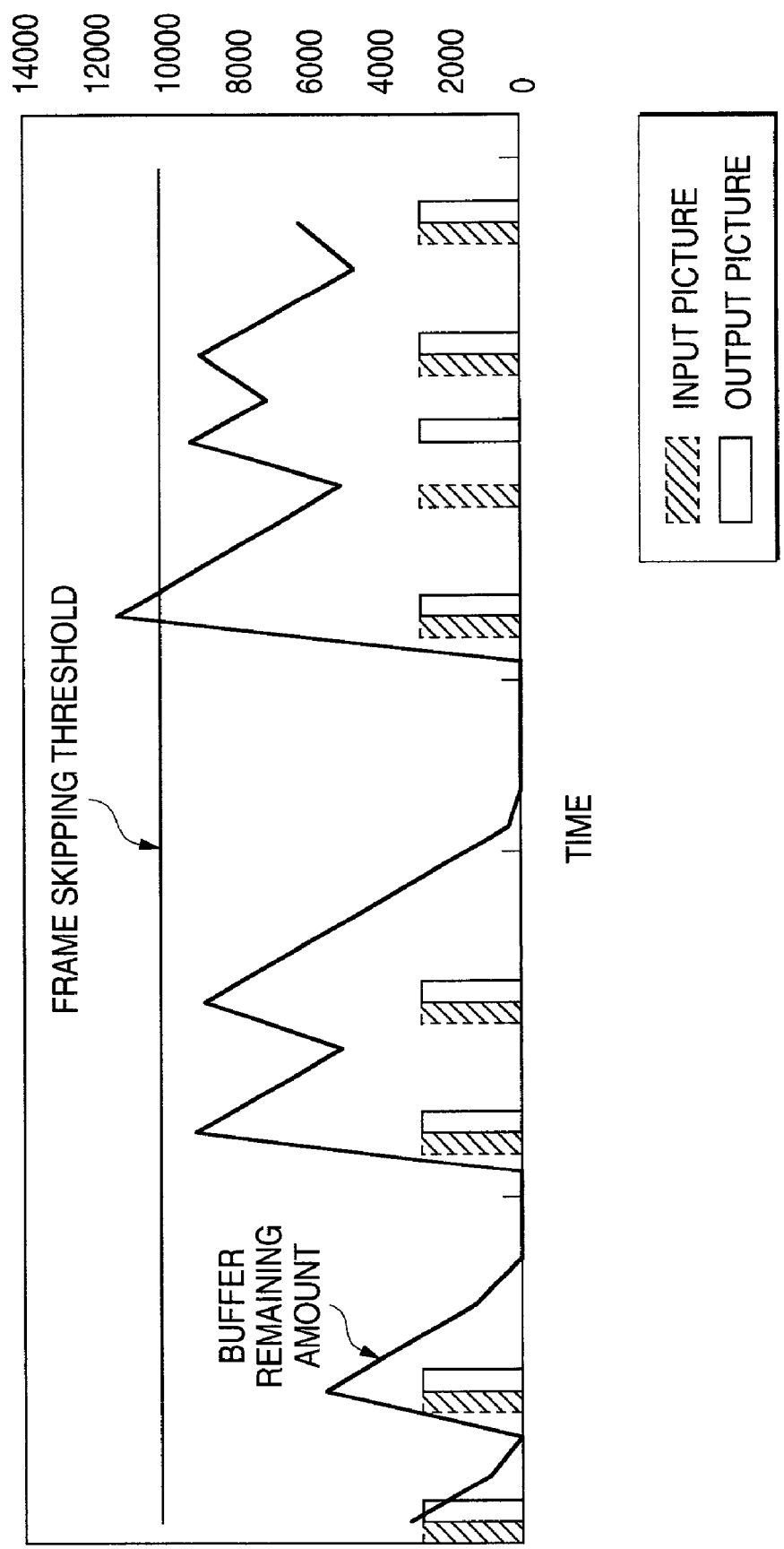
FIG. 7 shows a transition of a buffer remaining amount by a rate control with employment of an average value of input frame rates.
Figure 8:
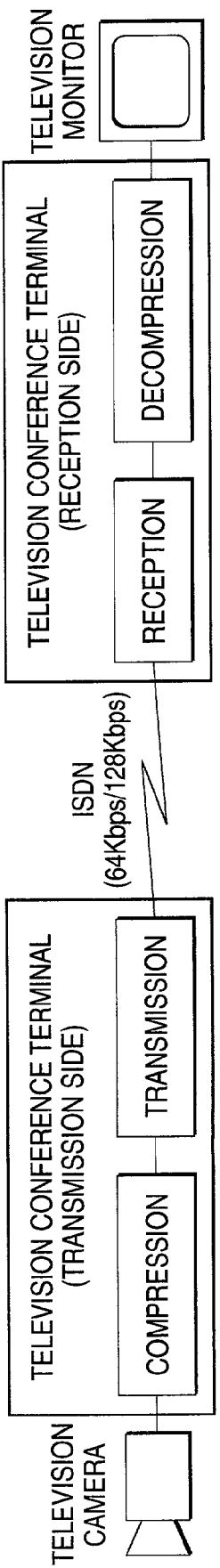
FIG. 8 represents an example of a picture transmission in a television conference system.
Figure 9:
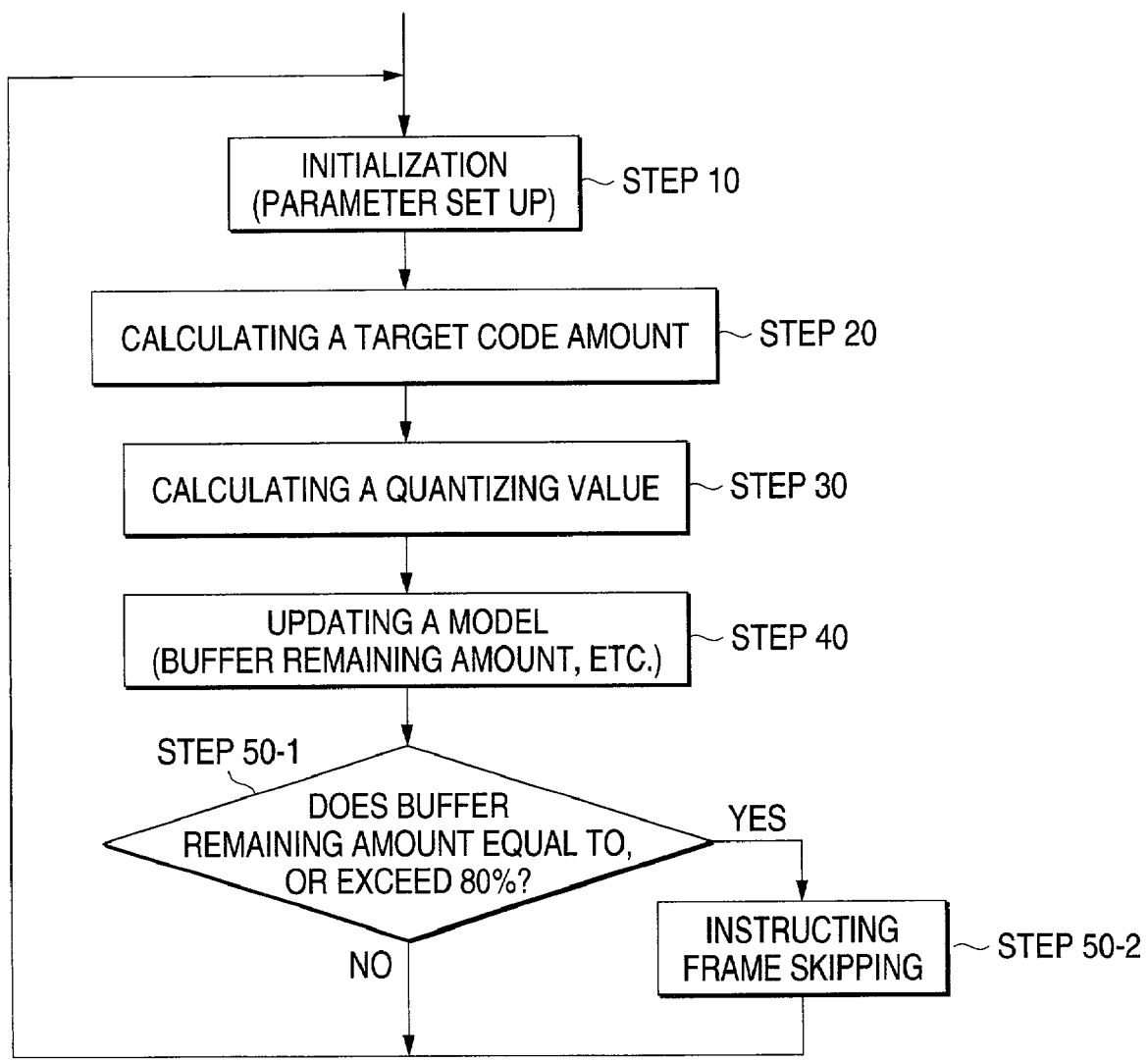
FIG. 9 is a flow operation of the rate control by MPEG-4 VM16.
Figure 10:
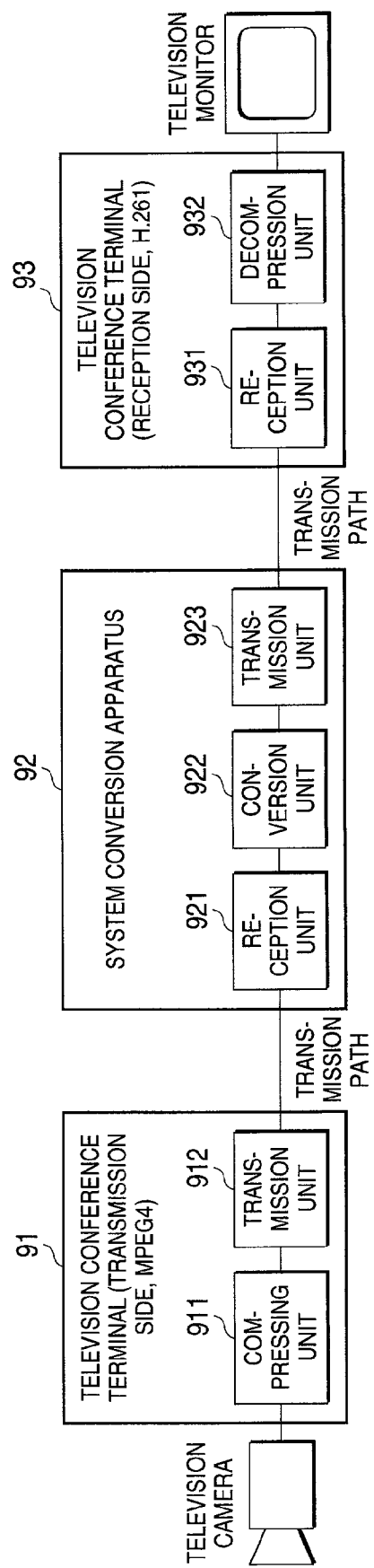
FIG. 10 indicates an example of a picture transmission in a television conference system.
Figure 11:
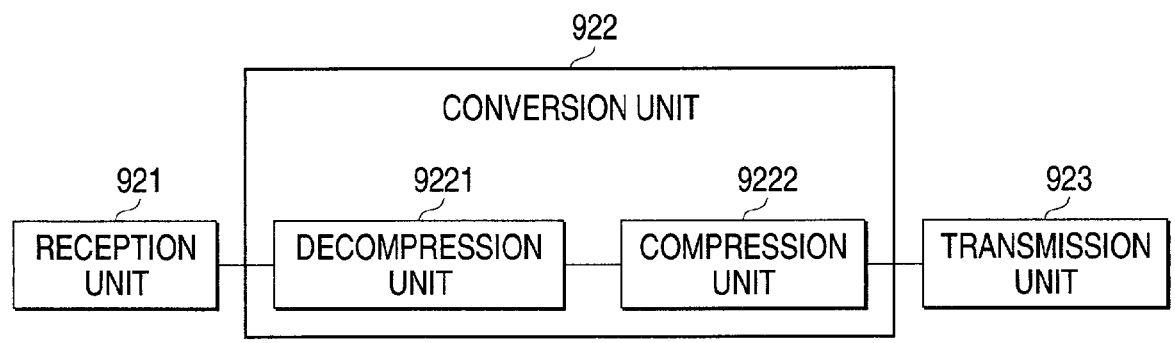
FIG. 11 is a diagram for showing a detailed structure of a system converting apparatus in the television conference system of FIG. 10.

FIG. 7 is a graphic representation for graphically showing that a transition of a buffer remaining amount of a picture coding apparatus with employment of this determining method is simulated based upon a calculation.

As previously described, in accordance with this third determining method, the code amount allocation can be realized in correspondence with the input frame rate, while the useless code amount can be hardly produced similar to the second determining method. In addition, when the input frame rate is rapidly varied, the larger reference target code amount can be hardly set, so that the frame skipping operation can be reduced.

As previously explained, in accordance with the present invention, even in such a case that the frame rate of the input picture is unknown and is furthermore varied, such a code amount allocation can be carried out, while the usable code amount is not useless.

What is claimed is:

1. A picture coding method including the steps of:
inputting moving picture data having an arbitrary frame rate that is not known in advance;
determining the input frame rate of the inputted moving picture data;
providing a target value for a buffer storage amount;
determining a buffer remaining amount of the coded picture data stored in a buffer and not yet outputted by the apparatus;
calculating a correction amount based on a difference of said target value and said buffer remaining amount; and
calculating a target code amount for use in said coding step by adding said correction amount to said reference target code amount, wherein said target code amount is based on said input frame rate;
providing a reference coding frame rate based upon said input frame rate;
calculating a reference target code amount using said reference coding frame rate, wherein said target code amount is determined based upon the reference target code amount; and
updating said reference coding frame rate, wherein
said reference coding frame rate is determined based upon an average value of said measured frame rates within a time interval, and wherein, when the reference coding frame rate before being updated is larger than the reference coding frame rate after being updated, a value between said reference coding frame rate before being updated and said reference coding frame rate after being updated is used as an updated reference coding frame rate.

2. A picture coding method including the steps of:
inputting moving picture data having an arbitrary frame rate that is not known in advance;
determining the input frame rate of the inputted moving picture data;
providing a reference coding frame rate;
determining a reference target code amount using said reference coding frame rate;

providing a target value for a buffer storage amount;

determining a buffer remaining amount of the coded picture data stored in a buffer and not yet outputted by the apparatus;

calculating a correction amount based on a difference of said predetermined target value and said buffer remaining amount;

calculating a target code amount for use in said coding step by adding said correction amount to said reference target code amount; and updating said reference coding frame rate, wherein, said reference coding frame rate is determined based upon an average value of said measured frame rates within a time interval, and wherein, when the reference coding frame rate before being updated is larger than the reference coding frame rate after being updated, a value between said reference coding frame rate before being updated and said reference coding frame rate after being updated is used as an updated reference coding frame rate.

3. A picture coding method including the steps of:

inputting moving picture data having an arbitrary frame rate;

coding said moving picture data into coded picture data for storage in a buffer prior to outputting said coded picture data;

determining the input frame rate of the inputted moving picture data;

determining a reference coding frame rate using said input frame rate;

calculating a reference target code amount using said reference coding frame rate;

determining a target value for a buffer storage amount using said reference coding frame rate;

determining a buffer remaining amount of the coded picture data stored in the buffer and not yet outputted by the apparatus;

calculating a correction amount based on a difference of said predetermined target value and said buffer remaining amount; and calculating a target code amount for use in said coding step by adding said correction amount to said reference target code amount, wherein the code amount of the outputted coded picture data is approximated to said target code amount in said coding step; and updating said reference coding frame rate, wherein said reference coding frame rate is determined based upon an average value of said measured frame rates within a time interval, and wherein, when the reference coding frame rate before being updated is larger than the reference coding frame rate after being updated, a value between said reference coding frame rate before being updated and said reference coding frame rate after being updated is used as an updated reference coding frame rate.

4. A picture coding method including the steps of:

determining a reference coding frame rate using the input frame rate of inputted moving picture data;

calculating a reference target code amount using said reference coding frame rate;

determining a target value for a buffer storage amount using said reference coding frame rate;

determining a buffer remaining amount of the coded picture data stored in a buffer and not yet outputted by the apparatus;

calculating a correction amount based on a difference of said predetermined target value and said buffer remaining amount; and calculating a target code amount for use in said coding step by adding said correction amount to said reference target code amount; and updating said reference coding frame rate, wherein, said reference coding frame rate is determined based upon an average value of said measured frame rates within a time interval, and wherein, when the reference coding frame rate before being updated is larger than the reference coding frame rate after being updated, a value between said reference coding frame rate before being updated and said reference coding frame rate after being updated is used as the updated reference coding frame rate.

* * * * *